United States Patent [19]

Ishizumi et al.

[11] 3,923,710

[45] Dec. 2, 1975

[54] PRODUCTION OF QUINAZOLINONE COMPOUNDS

[75] Inventors: Kikuo Ishizumi, Ikeda; Kazuo Mori, Kobe; Michihiro Yamamoto, Nishinomiya; Masao Koshiba; Shigeho Inaba, both of Takarazuka; Hisao Yamamoto, Nishinomiya, all of Japan

[73] Assignee: Sumitomo Chemical Company, Limited, Osaka, Japan

[22] Filed: Mar. 29, 1973

[21] Appl. No.: 346,037

[30] Foreign Application Priority Data
Mar. 31, 1972 Japan.................................. 47-32966

[52] U.S. Cl.... 260/251 QB; 260/307 A; 260/319.1; 260/326.13 R; 260/326.16
[51] Int. Cl.²........................................ C07D 239/82
[58] Field of Search.............................. 260/251 QB

[56] References Cited
UNITED STATES PATENTS
3,712,892   1/1973   Inaba et al.................... 260/251 QB

*Primary Examiner*—Raymond V. Rush
*Attorney, Agent, or Firm*—Stevens, Davis, Miller & Mosher

[57] ABSTRACT

2(1H)-Quinazolinone derivatives are prepared by reacting an indole-2-isocyanate derivative with an oxidizing agent, or by reacting an indole-2-isocyanate derivative with ozone to yield an ozone adduct thereof and converting said adduct. The obtained quinazolinone derivatives are useful as anti-inflammatory agent, or as intermediates for preparing other medicines.

5 Claims, No Drawings

PRODUCTION OF QUINAZOLINONE COMPOUNDS

This invention relates to a process for preparing quinazolinone derivatives and intermediates to obtain these quinazolinone derivatives.

More particularly, this invention relates to a process for preparing quinazolinone derivatives of the formula,

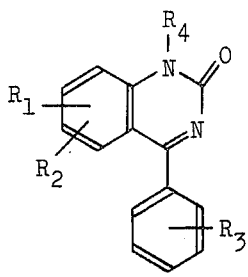

wherein $R_1$, $R_2$ and $R_3$ are independently a hydrogen atom, a halogen atom, a trifluoromethyl group, a nitro group, a lower alkyl group or a lower alkoxy group; and $R_4$ is a hydrogen atom, a lower alkyl group, an aralkyl group, a lower alkanoyloxyalkyl group, a lower alkoxyalkyl group, a polyhaloalkyl group or a cycloalkylalkyl group, and intermediates to obtain these quinazolinone derivatives.

The term "halogen" includes all halogen atoms, i.e. fluorine, chlorine, bromine and iodine; the term "alkyl" means both straight and branched chain aliphatic hydrocarbon radicals, and lower alkyl is, for example, $C_{1-4}$ alkyl which includes such groups as methyl, ethyl, n-propyl, isopropyl, n-butyl, iso-butyl, and tertiary-butyl; the term "lower alkoxy" is, for example $C_{1-4}$ alkoxy which includes such groups as methoxy, ethoxy, n-propoxy, isopropoxy, n-butoxy and tertiary-butoxy; the term "aralkyl" is, for example, a benzyl, phenethyl, chlorobenzyl or fluorobenzyl group; the term "lower alkanoyloxyalkyl" is, for example, $(C_{2-3}$ alkanoyloxy$)$ $C_{1-4}$ alkyl in which the $C_{2-3}$ alkanoyloxy moiety includes such groups as acetoxy and propionyloxy, and the $C_{1-4}$ alkyl moiety is as mentioned above; the term "lower alkoxyalkyl" is, for example, $(C_{1-4}$ alkoxy$)$ $C_{1-4}$ alkyl in which both moieties are as mentioned above; the term "polyhaloalkyl" is, for example, a trichloromethyl, trifluoromethyl, trichloroethyl, trifluoroethyl, or pentafluoropropyl group; the term "cycloalkylalkyl" is, for example, $(C_{3-6}$ cycloalkyl$)C_{1-4}$ alkyl in which the $C_{3-6}$ cycloalkyl moiety includes such groups as cyclopropyl, cyclobutyl, cyclopentyl, cyclohexyl, methylcyclopropyl and dimethylcyclopropyl, and the $C_{1-4}$ alkyl moiety is as mentioned above.

It is known that the quinazolinone derivatives of the formula [I] can be prepared by reacting an o-aminobenzophenone derivative of the formula,

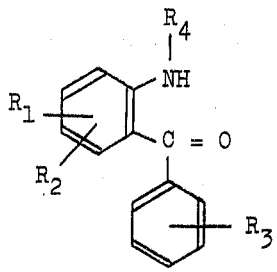

wherein $R_1$, $R_2$, $R_3$ and $R_4$ are as defined above, with, for example, an urea. But the above-mentioned process has many disadvantages as mentioned below; many of the starting o-aminobenzophenone derivatives of the formula [II] are difficult to obtain by synthesis; the compound of the formula [II] having a substituent group such as an alkyl group as $R_4$, in general, has to be prepared through three stage procedures from that having a hydrogen atom as $R_4$; the condensation reaction mentioned above must be carried out at high temperatures and the after-treatment required for such process is very difficult to operate, and etc.

It is an object of this invention to provide a novel process for preparing a quinazolinone derivative of the formula [I] using an easily obtainable indole derivative, without using an o-aminobenzophenone derivative which has many disadvantages as mentioned above, as a starting material. It is a further object of the present invention to provide a novel process for preparing a quinazolinone derivative of the formula [I] under mild reaction conditions overcoming many disadvantages of the process using an o-aminobenzophenone derivative as a starting material. Further objects and advantages of the present invention will be apparent to one skilled in the art from the accompanying disclosure and discussion.

The present invention provides a process for preparing a quinazolinone derivative of the formula [I] which comprises reacting an indole-2-isocyanate derivative of the formula,

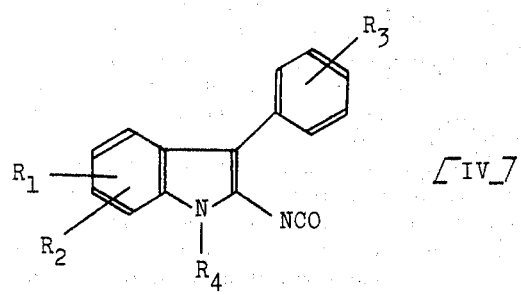

wherein $R_1$, $R_2$, $R_3$ and $R_4$ are as defined above, with an oxidizing agent.

The indole-2-isocyanate derivative of the formula [IV] can be obtained by subjecting an azide derivative of the formula [III] to the removal of the nitrogen atoms and the rearrangement. Thus the process of the present invention can be shown by the following reaction schema:

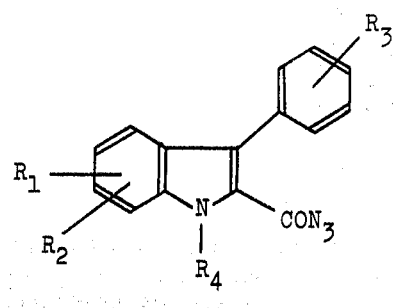

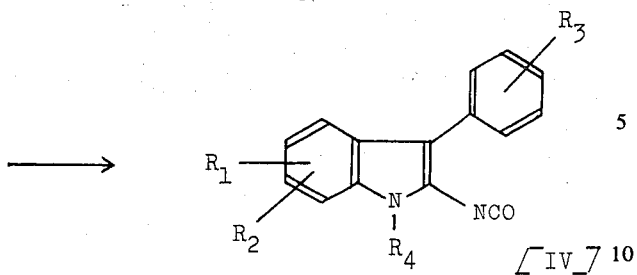

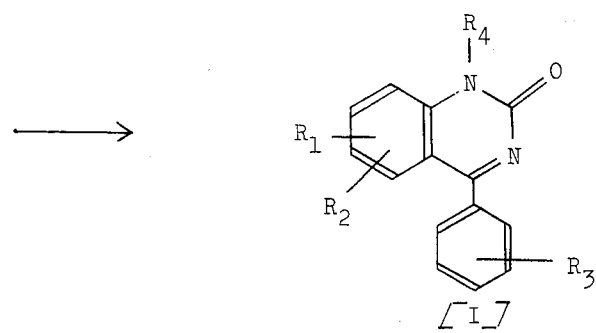

As is clear from the reaction schema mentioned above, the process of the present invention includes a ring enlargement of an indole ring to a quinazoline ring, which is not known in the prior art and cannot be expected from any literature.

According to the process of the present invention, an isocyanate derivative of the formula [IV] is reacted with an oxidizing agent preferably in a solvent.

As the oxidizing agent, such compounds as ozone, hydrogen peroxide, a peracid (e.g. performic acid, peracetic acid, perbenzoic acid, etc.), chromic acid, halogen, hypohalite of sodium, potassium or calcium and the like are preferably used.

As the solvent, which may be varied with the kind of an oxidizing agent to be used, water, chloroform, carbon tetrachloride, acetic acid, formic acid, acetone, alcohols, tetrahydrofuran and the like may be used.

The reaction may be carried out at room temperature with ease and if necessary, the reaction may be conducted by cooling or heating.

When ozone is used as an oxidizing agent in the above reaction, a novel intermediate, an ozone adduct, can be isolated with careful aftertreatment. Said intermediate is presumed to have the formula,

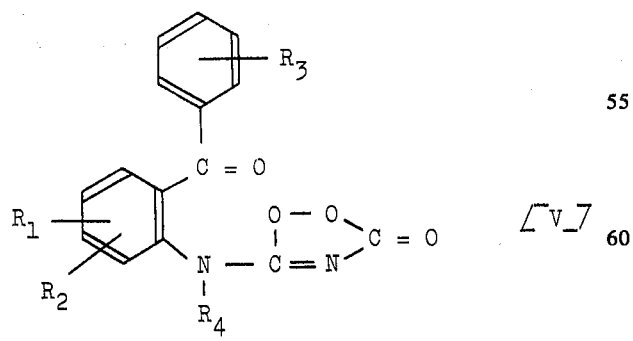

wherein $R_1$, $R_2$, $R_3$ and $R_4$ are as defined above, and can be converted to a quinazolinone derivative of the formula [I] when it is allowed to stand at room temperature. The conversion rate of the ozone adduct of the formula [V] to the quinazolinone derivative of the formula [I] can be accelerated by heating in the presence or absence of a solvent. This conversion can also be effected by reduction. As the reducing agent, sodium or potassium iodide, zinc, magnesium, formaldehyde, sodium bisulfite and the like may be used. The reduction can be conducted catalytically. Needless to say, the quinazolinone derivative of the formula [I] can be obtained directly from an isocyanate derivative of the formula [IV] without isolating the intermediate of the formula [V] when ozone is used as an oxidizing agent.

The isocyanate derivative of the formula [IV] can easily be obtained by rearrangement of an azide derivative of the formula [III]. The rearrangement reaction can be carried out at room temperature in dry state, and it can be accelerated by heating in the presence or absence of a solvent. As the solvent, such inert solvents as benzene, toluene, ethers, tetrahydrofuran, and the like may be used.

The quinazolinone derivatives of the formula [I] obtained by the process of this invention are useful as excellent anti-inflammatory and analgesic agents with low toxicity and they are also useful as intermediates for preparing other excellent anti-inflammatory agents and central nervous system depressant.

According to the process of the present invention, the following quinazolinone derivatives, for example, can be obtained.

4-Phenyl-2(1H)-quinazolinone
4-Phenyl-6-chloro-2(1H)-quinazolinone
4-Phenyl-6-bromo-2(1H)-quinazolinone
4-Phenyl-6-fluoro-2(1H)-quinazolinone
4-Phenyl-6-methyl-2(1H)-quinazolinone
4-Phenyl-6-methoxy-2(1H)-quinazolinone
4-Phenyl-6-nitro-2(1H)-quinazolinone
4-Phenyl-6-trifluoromethyl-2(1H)-quinazolinone
4-Phenyl-6,8-dichloro-2(1H)-quinazolinone
4-Phenyl-6,7-dimethoxy-2(1H)-quinazolinone
4-(o-Chlorophenyl)-6-chloro-2(1H)-quinazolinone
4-(o-Chlorophenyl)-6-nitro-2(1H)-quinazolinone
4-(o-Fluorophenyl)-6-chloro-2(1H)-quinazolinone
1-Methyl-4-phenyl-2(1H)-quinazolinone
1-Methyl-4-phenyl-6-chloro-2(1H)-quinazolinone
1-Methyl-4-phenyl-6-iodo-2(1H)-quinazolinone
1-Methyl-4-phenyl-6-methoxy-2(1H)-quinazolinone
1-Methyl-4-phenyl-6-nitro-2(1H)-quinazolinone
1-Methyl-4-phenyl-6-trifluoromethyl-2(1H)-quinazolinone
1,6-Dimethyl-4-phenyl-2(1H)-quinazolinone
1-Ethyl-4-phenyl-6-nitro-2(1H)-quinazolinone
1-Ethyl-4-(o-tolyl)-6-chloro-2(1H)-quinazolinone
1-Isopropyl-4-phenyl-6-chloro-2(1H)-quinazolinone
1-Isopropyl-4-phenyl-6-methoxy-2(1H)-quinazolinone
1-Isopropyl-4-phenyl-6-nitro-2(1H)-quinazolinone
1-Isopropyl-4-phenyl-6-trifluoromethyl-2(1H)-quinazolinone
1-Isobutyl-4-phenyl-6-chloro-2(1H)-quinazolinone
1-(2,2,2-Trifluoroethyl)-4-phenyl-6-chloro-2(1H)-quinazolinone
1-(2,2,3,3,3-Pentafluoropropyl)-4-phenyl-6-chloro-2(1H)-quinazolinone
1-Benzyl-4-phenyl-6-nitro-2(1H)-quinazolinone
1-Acetoxyethyl-4-phenyl-6-chloro-2(1H)-quinazolinone
1-Acetoxyethyl-4-phenyl-6-nitro-2(1)-quinazolinone 1-Methoxymethyl-4-phenyl-6-chloro-2(1H)-quinazolinone 1-(2-Ethoxyethyl)-4-phenyl-6-nitro-2(1H)-quinazolinone 1-Cyclopropylmethyl-4-phenyl-6-chloro-2(1H)-quinazolinone 1-Cyclopropylmethyl-4-phenyl-6-nitro-2(1H)-quinazolinone 1-Cyclopropylmethyl-4-phenyl-6-trifluoromethyl-2(1H)-quinazolinone 1-Cyclopropylmethyl-4-phenyl-6-bromo-2(1H)-quinazolinone 1-Cyclopropylmethyl-4-phenyl-6,8-dichloro-2(1H)-quinazolinone 1-Cyclopropylmethyl-4-phenyl-6-methoxy-2(1H)-quinazolinone 1-Cyclopropylmethyl-4-(o-fluorophenyl)-6-chloro-2(1H)-quinazolinone 1-Cyclopropylmethyl-4-(m-chlorophenyl)-6-chloro-2(1H)-quinazolinone 1-Cyclopropylmethyl-4-(o-chlorophenyl)-6-nitro-2(1H)-quinazolinone 1-Cyclopentylmethyl-4-phenyl-6-nitro-2(1H)-quinazolinone 1-Cyclohexylmethyl-4-phenyl-6-nitro-2(1H)-quinazolinone The invention is illustrated more particularly by way of the following examples but, as will be more apparent, is not limited to the details thereof.

EXAMPLE 1

After 25 g of 1-methyl-3-phenyl-5-chloroindole-2-carboxylic acid azide was allowed to stand for 40 days at room temperature in a desiccator, 1-methyl-3-phenyl-5-chloroindole-2-isocyanate was obtained quantitatively. On heating the obtained product, the decomposition was recognized at 153°C but it did not melt over 300°C without showing any remarkable changes.

EXAMPLE 2

A suspension of 2 g of 1-methyl-3-phenyl-5-chloroindole-2-carboxylic acid azide in 5 ml of benzene was heated for 5 minutes on a water bath heated at 50°–60°C. Insoluble material was filtered off. After cooling the filtrate, the deposited crystals were collected by filtration to obtain 1-methyl-3-phenyl-5-chloroindole-2-isocyanate having a melting point of 150°C (decomposition).

EXAMPLE 3

To a solution of 1.7 g of potassium hydroxide in 10 ml of water, 1.0 g of bromine was added below 0°C. To the resulting mixture 1.42 g of 1-methyl-3-phenyl-5-chloroindole-2-isocyanate was added and the reaction mixture was stirred below 0°C for 30 minutes. After continued sirring additional one hour at room temperature, the reaction mixture was heated at 70°–80°C for 1 hour. After cooling, crystals were collected by filtration and dried. The crystals were purified by column chromatography using 50 g of silica gel and ethyl acetate as a solvent to obtain 1-methyl-4-phenyl-6-chloro-2(1H)-quinazolinone having a melting point of 218°–221°C.

EXAMPLE 4

To a suspension of 2.0 g of 1-methyl-3-phenyl-5-chloroindole-2-isocyanate in 30 ml of acetic acid, a mixed gas of ozone and oxygen was introduced at 15°C with stirring. To a solution of reaction mixture, water was added and the resulting solution was extracted with ether. The extracted ether layer was washed with a diluted aqueous solution of sodium hydroxide and water, and dried over Glauber's salt. After distilling off the solvent under reduced pressure, 1.53 g of residue was obtained. The residue was washed with ether to give 1-methyl-3-phenyl-5-chloroindole-2-isocyanate.ozone adduct having a melting point of 102°–3°C (decomposition). Recrystallized from a mixed solution of tetrahydrofuran and ether, there was obtained colorless needless having a melting point of 103.5°–105.5°C (decomposition).

| Elementary analysis: | C (%) | H (%) | N (%) | Cl (%) |
|---|---|---|---|---|
| Calcd. for $C_{16}H_{11}O_4N_2Cl$ | 58.11 | 3.35 | 8.47 | 10.72 |
| Found | 58.29 | 3.25 | 8.57 | 10.82 |

Infrared absorption spectrum (Nujol) $cm^{-1}$: 1802, 1674, 1638, 1596.

EXAMPLE 5

After dissolving 30 mg of 1-methyl-3-phenyl-5-chloroindole-2-isocyanate.ozone adduct in 1 ml of pyridine, the resulting solution was refluxed for 1 hour. After cooling the reaction mixture, water was added thereto and the deposited crystals were collected by filtration. The crystals were washed with ether to obtain 1-methyl-4-phenyl-6-chloro-2(1H)-quinazolinone having a melting point of 219°–221°C.

EXAMPLE 6

1-Methyl-3-phenyl-5-chloroindole-2-isocyanate.ozone adduct (60 mg) was allowed to stand at room temperature for a month. The resulting material was washed with ether and recrystallized from isopropanol to give 1-methyl-4-phenyl-6-chloro-2(1H)-quinazolinone having a melting point of 221°–222°C.

EXAMPLE 7

After repeating the same procedure as described in Example 4, the resulting reaction mixture was treated with isopropanol to obtain crystals, which were 1-methyl-4-phenyl-6-chloro-2(1H)-quinazolinone having a melting point of 220°–222°C.

EXAMPLE 8

To a suspension of 1.0 g of 1-methyl-3-phenyl-5-chloroindole-2-isocyanate in 10 ml of acetic acid, a solution of 1.0 g of anhydrous chromic acid in 1 ml of water was added dropwise at 15°–20°C with stirring. After the reaction was carried out at room temperature for 3 hours, 50 ml of water was added to the reaction mixture and the resulting mixture was extracted with chloroform. Crystals insoluble in both chloroform and water were filtered off. The extracted chloroform layer was washed with water and dried over Glauber's salt and the solvent was removed by distillation under reduced pressure. The obtained residue was washed with ether and recrystallized from isopropanol to give 1-methyl-4-phenyl-6-chloro-2(1H)-quinazolinone having a melting point of 222°–223°C.

The insoluble crystals at the extraction with chloroform were neutralized with ammonia water and the resulting solution was extracted with chloroform. The extract was washed with water and dried over Glauber's salt and the solvent was removed by distillation under reduced pressure. The resulting crystals have a melting point of 197°–200°C. Recrystallized from isopropanol, there was obtained 1-methyl-2-imino-3-phenyl-5-chloro-3-indolinol.

What is claimed is:

1. A process for preparing a quinazolinone of the formula,

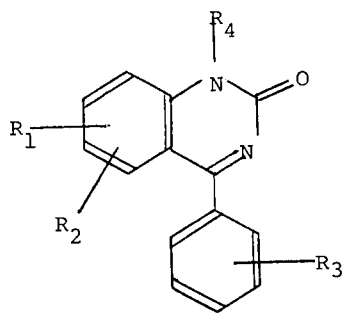

[I]

wherein $R_1$, $R_2$ and $R_3$ are independently a hydrogen atom, a halogen atom, trifluoromethyl, nitro, lower alkyl or lower alkoxy; and $R_4$ is a hydrogen atom, lower alkyl, benzyl, chlorobenzyl, fluorobenzyl, phenethyl, $C_1$–$C_4$ alkoxy-$C_1$–$C_4$ alkyl, polyhalo $C_1$–$C_3$ alkyl or $C_3$–$C_6$ cycloalkyl-$C_1$–$C_4$ alkyl, which comprises the step of reacting an indole-2-isocyanate of the formula,

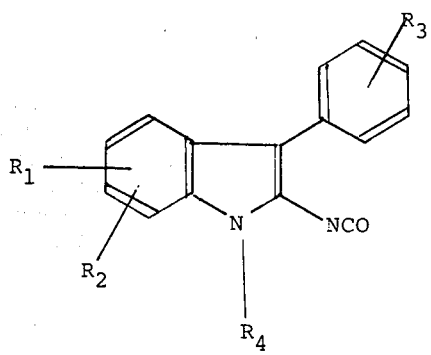

[IV]

wherein $R_1$, $R_2$, $R_3$ and $R_4$ are as defined above, in acetic acid with an oxidizing agent selected from the group consisting of ozone-oxygen and chromic acid.

2. A process according to claim 1, wherein the indole-2-isocyanate of the formula [IV] is obtained by allowing to stand at room temperature in the dry state or heating in the presence or absence of an inert solvent an azide of the formula,

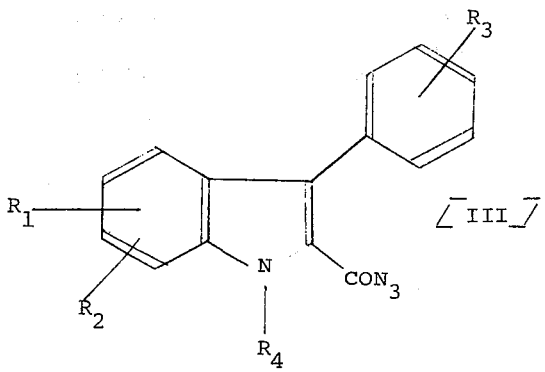

[III]

wherein $R_1$, $R_2$, $R_3$ and $R_4$ are as defined in claim 1.

3. A process according to claim 1, wherein an indole-2-isocyanate is reacted with ozone-oxygen to yield a compound of the formula,

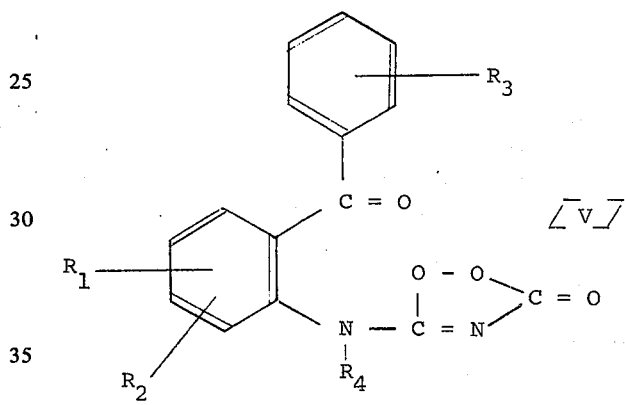

[V]

wherein $R_1$, $R_2$, $R_3$ and $R_4$ are as defined in claim 1, and converting the compound of the formula [V] by standing at room temperature, by heating in the presence or absence of a solvent or by reducing with an agent selected from the group consisting of sodium or potassium iodide, zinc, magnesium, formaldehyde and sodium disulfite to a quinazolinone of the formula [I].

4. A process according to claim 1, wherein the oxidizing agent is ozone-oxygen.

5. A process according to claim 2, wherein the rearrangement is carried out in the presence of a solvent selected from the group consisting of benzene, toluene, ethers, and tetrahydrofuran.

* * * * *